US010724495B2

(12) United States Patent
Hirayama et al.

(10) Patent No.: US 10,724,495 B2
(45) Date of Patent: Jul. 28, 2020

(54) GAS ENGINE SYSTEM

(71) Applicant: KAWASAKI JUKOGYO KABUSHIKI KAISHA, Kobe-shi, Hyogo (JP)

(72) Inventors: Towa Hirayama, Kakogawa (JP); Hidekazu Iwasaki, Kobe (JP); Hiroyoshi Ishii, Kobe (JP); Yosuke Nonaka, Himeji (JP); Tomoaki Kizuka, Takatsuki (JP); Shigeharu Fujihara, Amagasaki (JP); Satoru Fukao, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/066,732

(22) PCT Filed: Dec. 28, 2016

(86) PCT No.: PCT/JP2016/089183
§ 371 (c)(1),
(2) Date: Jun. 28, 2018

(87) PCT Pub. No.: WO2017/115864
PCT Pub. Date: Jul. 6, 2017

(65) Prior Publication Data
US 2018/0372055 A1    Dec. 27, 2018

(30) Foreign Application Priority Data

Dec. 28, 2015 (JP) ................................ 2015-255998

(51) Int. Cl.
*F02P 5/152* (2006.01)
*F02B 19/12* (2006.01)
(Continued)

(52) U.S. Cl.
CPC ............ *F02P 5/152* (2013.01); *F02B 19/108* (2013.01); *F02B 19/12* (2013.01); *F02B 43/00* (2013.01);
(Continued)

(58) Field of Classification Search
CPC . F02D 37/02; F02P 5/00; F02P 5/1525; F02P 5/1526; F02P 5/04; F02P 5/15;
(Continued)

(56) References Cited

U.S. PATENT DOCUMENTS

2005/0183697 A1* 8/2005 Yoshino .................. F02P 5/152
123/406.37
2005/0188954 A1* 9/2005 Yoshino ................ F02D 35/025
123/406.29
(Continued)

FOREIGN PATENT DOCUMENTS

| JP | 2007-247569 A | | 9/2007 |
| JP | 2010-84681 | * | 4/2010 |
| JP | 2010-084681 A | | 4/2010 |

*Primary Examiner* — John Kwon
(74) *Attorney, Agent, or Firm* — Oliff PLC

(57) ABSTRACT

A gas engine system controller: calculates a delay calculation value of a knocking occurrence ratio; determines a primary target ignition timing; sets the primary target ignition timing as a current ignition timing if the occurrence ratio difference is positive and an ignition timing does not exceed a converted value of a first advance rate; determines whether a rapid advance condition is satisfied if the occurrence ratio difference is positive and the ignition timing difference exceeds the converted value of the first advance rate; sets a secondary target ignition timing as the current ignition timing if the rapid advance condition is not satisfied, the secondary target ignition timing obtained by adding the converted value of the first advance rate to the previous ignition timing; and determines the current ignition timing
(Continued)

so as to achieve a second advance rate greater than the first advance rate if the rapid advance condition is satisfied.

12 Claims, 6 Drawing Sheets

(51) Int. Cl.
　　F02D 19/10　　　(2006.01)
　　F02B 43/00　　　(2006.01)
　　F02D 37/02　　　(2006.01)
　　F02B 19/10　　　(2006.01)
　　F02D 35/02　　　(2006.01)
　　F02P 5/153　　　(2006.01)
　　F02D 41/14　　　(2006.01)
　　F02P 5/00　　　(2006.01)
　　F02D 41/00　　　(2006.01)

(52) U.S. Cl.
　　CPC ........... *F02D 19/10* (2013.01); *F02D 35/023* (2013.01); *F02D 37/02* (2013.01); *F02D 41/1498* (2013.01); *F02P 5/153* (2013.01); *F02D 41/0027* (2013.01); *F02D 2200/025* (2013.01); *F02D 2200/0618* (2013.01); *F02D 2200/101* (2013.01); *Y02T 10/32* (2013.01); *Y02T 10/46* (2013.01)

(58) Field of Classification Search
　　CPC　F02P 5/145; F02P 5/1504; F02P 5/151; F02P 5/1521
　　USPC ............ 123/406.11, 406.16, 406.17, 406.21, 123/406.22, 406.23, 406.29, 406.34, 123/406.41, 406.44
　　See application file for complete search history.

(56) References Cited

U.S. PATENT DOCUMENTS

| | | | |
|---|---|---|---|
| 2005/0197762 A1* | 9/2005 | Yoshino | F02D 35/028 |
| | | | 701/111 |
| 2011/0259298 A1* | 10/2011 | Imamura | F02B 19/108 |
| | | | 123/436 |
| 2015/0267631 A1* | 9/2015 | Miyamoto | F02D 41/3094 |
| | | | 123/445 |
| 2018/0313260 A1* | 11/2018 | Nonaka | F02D 19/02 |

* cited by examiner

GAS ENGINE SYSTEM

TECHNICAL FIELD

The present invention relates to a gas engine system including a gas engine.

BACKGROUND ART

It is known that, in a gas engine utilized in power generating equipment, high power generation efficiency is obtained by controlling the ignition timing to be advanced before the top dead center by a predetermined angle. However, in a case where the ignition timing is advanced, there is a problem of knocking.

For example, Patent Literature 1 discloses a gas engine system intended for power generating equipment, in which the ignition timing is adjusted such that a delay calculation value of a knocking occurrence ratio (e.g., a moving average value) becomes a target occurrence ratio. In this gas engine system, it is determined, for each cycle, based on the pressure in the cylinder whether or not allowable knocking has occurred. The knocking occurrence ratio means the ratio of the number of cycles in which allowable knocking has occurred to a predetermined number of cycles. In the gas engine system, if the delay calculation value of the knocking occurrence ratio is lower than the target occurrence ratio, the ignition timing is advanced based on the difference between the delay calculation value of the knocking occurrence ratio and the target occurrence ratio. If the delay calculation value of the knocking occurrence ratio is higher than the target occurrence ratio, the ignition timing is retarded based on the difference between the delay calculation value of the knocking occurrence ratio and the target occurrence ratio.

In the gas engine system disclosed by Patent Literature 1, in a case where the ignition timing is advanced, the advance speed is limited to a preset advance rate or lower.

CITATION LIST

Patent Literature

PTL 1: Japanese Laid-Open Patent Application Publication No. 2010-84681

SUMMARY OF INVENTION

Technical Problem

However, in the control as described above, when the load varies greatly, there is a case where the delay calculation value of the knocking occurrence ratio falls significantly below the target occurrence ratio. In this case, since the ignition timing is advanced only slowly due to the preset advance rate, the optimization of the ignition timing takes a long time. In other words, inefficient operation is continued for a long time. It should be noted that the advance rate is set to be relatively low so as to realize stable operation.

In view of the above, an object of the present invention is to provide a gas engine system that makes it possible to reduce the time required for the optimization of the ignition timing.

Solution to Problem

In order to solve the above-described problems, a gas engine system according to the present invention includes: a gas engine including at least one cylinder that combusts therein an air-fuel mixture of a fuel gas and air; an ignitor provided in the cylinder; a pressure sensor that detects a pressure in the cylinder; and a controller that controls the ignitor. The controller: calculates a delay calculation value of a knocking occurrence ratio based on the pressure in the cylinder, which is detected by the pressure sensor; determines a primary target ignition timing based on an occurrence ratio difference obtained by subtracting the delay calculation value of the knocking occurrence ratio from a target occurrence ratio, such that an ignition timing is advanced if the occurrence ratio difference is positive, and such that the ignition timing is retarded if the occurrence ratio difference is negative; sets the primary target ignition timing as a current ignition timing if the occurrence ratio difference is positive and an ignition timing difference obtained by subtracting a previous ignition timing from the primary target ignition timing does not exceed a converted value of a first advance rate; determines whether or not a rapid advance condition is satisfied if the occurrence ratio difference is positive and the ignition timing difference exceeds the converted value of the first advance rate; sets a secondary target ignition timing as the current ignition timing if the rapid advance condition is not satisfied, the secondary target ignition timing being obtained by adding the converted value of the first advance rate to the previous ignition timing; determines the current ignition timing so as to achieve a second advance rate greater than the first advance rate if the rapid advance condition is satisfied; and controls the ignitor such that the ignitor ignites the air-fuel mixture at the current ignition timing.

According to the above configuration, if the rapid advance condition is satisfied, the ignition timing is advanced by the second advance rate, which is greater than the first advance rate. Accordingly, the ignition timing is advanced rapidly, and the time required for the optimization of the ignition timing can be reduced.

The rapid advance condition may be at least one of the following conditions (a) to (c): the condition (a) is that the number of times allowable knocking has occurred within a predetermined period previous to a current time is less than a predetermined number of times; the condition (b) is that an absolute value of a difference between a target rotational speed and an actual rotational speed is less than a predetermined rotational speed; and the condition (c) is that an absolute value of a time rate of change of a fuel gas injection period is less than a predetermined rate of change. According to this configuration, frequent allowable knocking and the occurrence of unallowable knocking can be prevented even if the ignition timing is advanced rapidly.

If the rapid advance condition is satisfied, the controller may determine the current ignition timing by adding an additional amount calculated based on a preset addition rate to the secondary target ignition timing obtained by adding the converted value of the first advance rate to the previous ignition timing. According to this configuration, the proportion of the advance amount derived from the first advance rate in the advance amount derived front the second advance rate can be stored as a history.

The controller may determine whether or not a reset condition is satisfied, and if the reset condition is satisfied, the controller may correct the current ignition timing by subtracting a predetermined amount from the current ignition timing. According to this configuration, in a case where the reset condition is satisfied after the ignition timing is advanced rapidly, the ignition timing can be retarded instantaneously. For example, assume a case where the reset condition is the presence of rapid increase in the load. In this case, even if the load increases rapidly after the ignition timing is advanced rapidly, the occurrence of unallowable knocking can be prevented.

For example, the reset condition may be at least one of the following conditions (d) and (e): the condition (d) is that an absolute value of a difference between a target rotational speed and an actual rotational speed is greater than a predetermined rotational speed; and the condition (e) is that an absolute value of a time rate of change of a fuel gas injection period is greater than a predetermined rate of change.

Advantageous Effects of Invention

The present invention makes it possible to reduce the time required for the optimization of the ignition timing.

DESCRIPTION OF EMBODIMENTS

Embodiment 1

Figure 1:
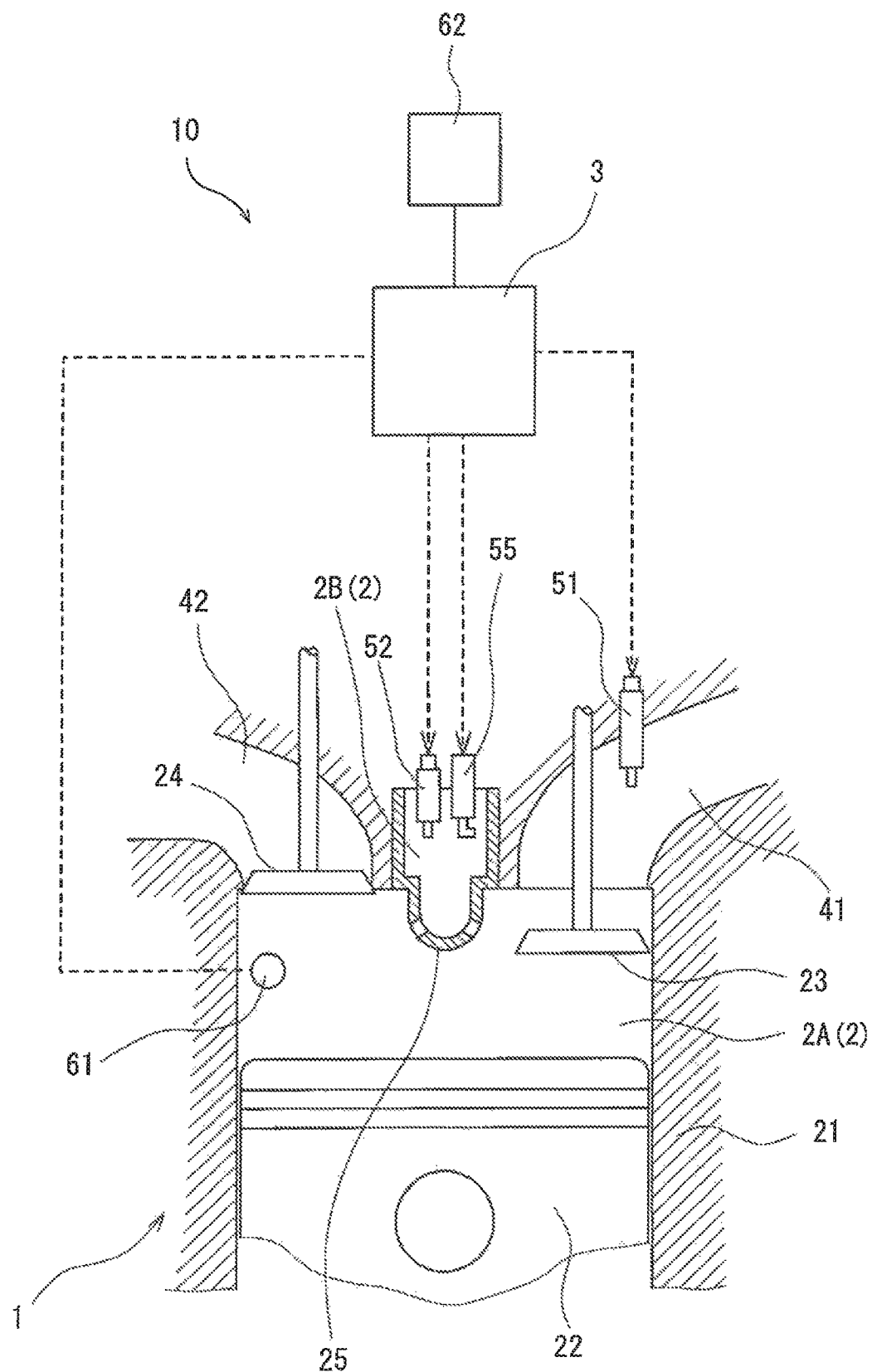
FIG. 1 shows a schematic configuration of a gas engine system according to Embodiment 1 of the present invention.

FIG. 1 shows a gas engine system 10 according to Embodiment 1 of the present invention. The gas engine system 10 includes a gas engine 1 and a controller 3.

The gas engine 1 may be a pure gas engine that combusts only a fuel gas (e.g., natural gas), or may be a dual fuel engine that combusts one of or both a fuel gas and a fuel oil. In the present embodiment, the gas engine 1 is a 4-stroke engine. However, as an alternative, the gas engine 1 may be a 2-stroke engine.

The gas engine 1 includes a plurality of cylinders 21 (FIG. 1 shows only one cylinder 21). Since all the cylinders 21 have the same configuration, only one cylinder 21 is described below.

In the cylinder 21, a piston 22 is disposed such that the piston 22 is movable in a reciprocating manner. The cylinder 21 and the piston 22 form a combustion chamber 2. The piston 22 is coupled to an unshown crank shaft by an unshown connecting rod.

In a case where the gas engine 1 is a 4-stroke engine, in the cylinder 21, the piston 22 reciprocates twice, and thereby one cycle of the gas engine 1 (intake, compression, expansion, and exhaust) is performed. The phase angle (0 to 720 degrees) of the gas engine 1 during one cycle of the cylinder 21 is detected by a phase angle detector 62. For example, the rotation angle of the crank shaft (i.e., crank angle) or the position of the piston 22 can be used as the phase angle. As one example, the phase angle detector 62 is an electromagnetic pickup, a proximity switch, or a rotary encoder. An actual rotational speed N (unit: rpm) of the gas engine 1 is also detected from the phase angle detector 62.

Air is supplied to the combustion chamber 2 through an intake passage 41, and exhaust gas is discharged from the combustion chamber 2 through an exhaust passage 42. The intake passage 41 is provided with a main fuel injection valve 51, which injects a fuel gas into the air supplied to the combustion chamber 2.

The cylinder 21 is provided with an intake valve 23, which opens and closes an intake port that is an opening of the intake passage 41, the opening facing the combustion chamber 2; and an exhaust valve 24, which opens and closes an exhaust port that is an opening of the exhaust passage 42, the opening facing the combustion chamber 2. The cylinder 21 is also provided with a spark plug 55 (one example of an ignitor) for igniting an air-fuel mixture of the fuel gas and the air in the combustion chamber 2. That is, the air-fuel mixture is combusted in the cylinder 21.

In the present embodiment, the combustion chamber 2 includes: a main combustion chamber 2A, which communicates with the intake passage 41 and the exhaust passage 42; and an auxiliary combustion chamber 2B, which is divided from the main combustion chamber 2A by a dividing wall 25 with communication holes formed therein. The spark plug 55 is disposed in the auxiliary combustion chamber 2B. The fuel gas is injected into the auxiliary combustion chamber 2B by an auxiliary fuel injection valve 52. A rich air-fuel mixture is formed in the auxiliary combustion chamber 2B by the injection of the fuel gas from the auxiliary fuel injection valve 52, and the air-fuel mixture is ignited by the spark plug 55. As a result, a flame is generated in the auxiliary combustion chamber 2B, and the flame propagates into the main combustion chamber 2A through the communication holes formed in the dividing wall 25. Consequently, a lean air-fuel mixture in the main combustion chamber 2A is also ignited. The cylinder 21 is provided with a pressure sensor 61, which detects a pressure P in the cylinder 21 (the pressure in the main combustion chamber 2A).

It should be noted that the ignitor is not limited to the spark plug 55, which ignites the air-fuel mixture in the auxiliary combustion chamber 2B. For example, a pilot fuel injection valve that directly injects a high-pressure pilot fuel (oil or fuel gas) into the main combustion chamber 2A to cause self-ignition of the pilot fuel can be adopted as the ignitor (in this case, the auxiliary combustion chamber 2B may be eliminated).

The fuel injection valves 51 and 52 and the spark plug 55 are controlled by the controller 3 based on, for example, the phase angle detected by the phase angle detector 62. The controller 3 adjusts the ignition timing for each cycle, such that a delay calculation value of a knocking occurrence ratio Kr becomes a target occurrence ratio Kt (e.g., 7.5%). In the present embodiment, the ignition timing is an angle (crank angle) relative to the top dead center, and indicates how much before the top dead center the ignition should be performed.

The knocking occurrence ratio Kr is the ratio of the number of cycles Ck in which allowable knocking has occurred to a predetermined number of cycles Cy (i.e., Kr=Ck/Cy). The predetermined number of cycles Cy may be, for example, preset to a particular number of cycles, such as 50 cycles, or may be, for example, the number of cycles measured within a preset period of time, such as 5 to 15 seconds. In the present embodiment, the delay calculation value of the knocking occurrence ratio Kr is a moving average value of the knocking occurrence ratio Kr. However, as an alternative, the delay calculation value may be a first-order lag calculation value.

Hereinafter, control performed by the controller 3 is described in detail with reference to the flowchart of FIG. 2.

Based on the pressure P in the cylinder 21, which is detected by the pressure sensor 61, the controller 3 determines, for each cycle, whether the combustion state is unallowable knocking (D), allowable knocking (C), normal (A), or misfire (B) (step S1).

Figure 3:
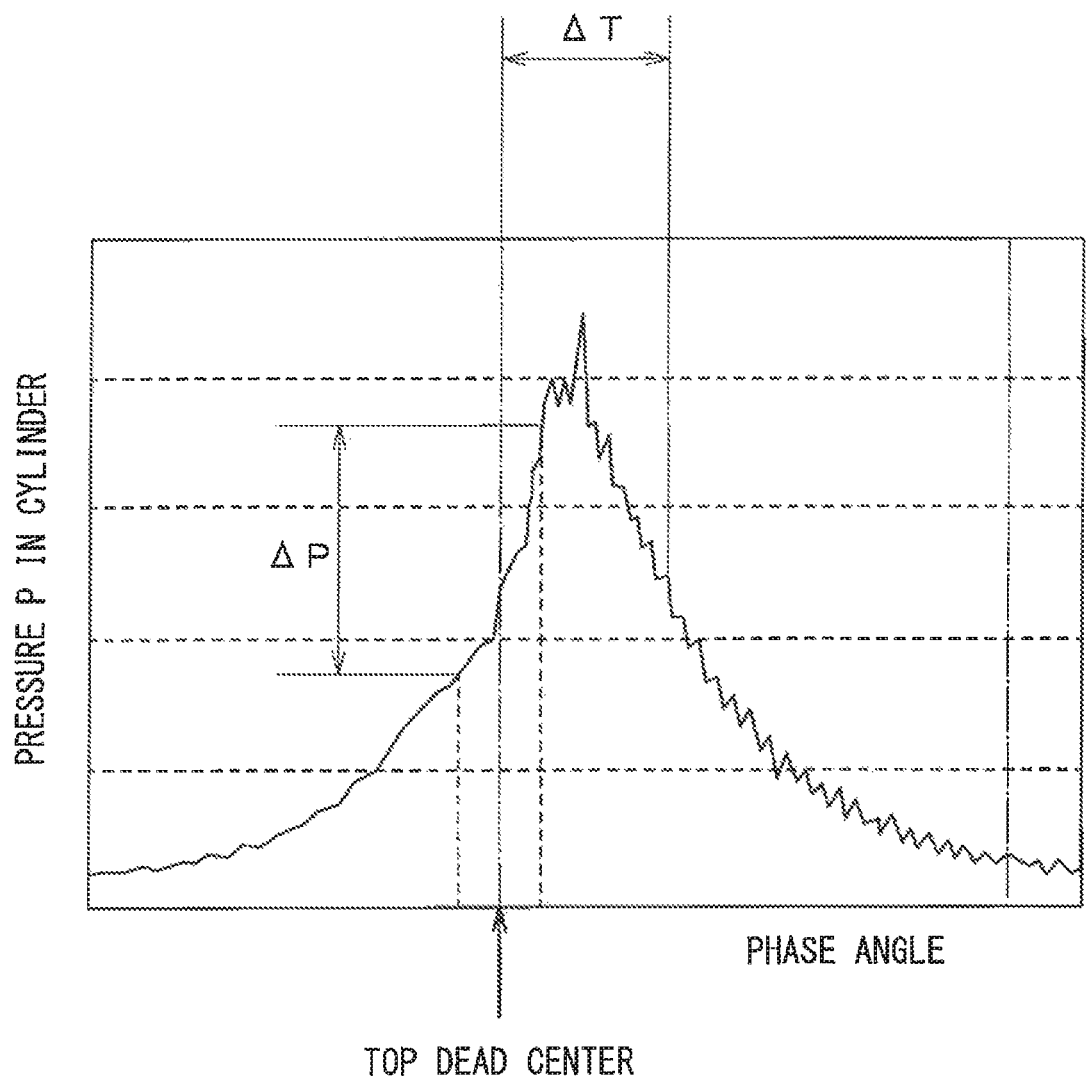
FIG. 3 shows one example of the waveform of the pressure in a cylinder.

The combustion state is determined, for example, by the following method. The controller 3 passes the waveform, shown in FIG. 3, of the pressure in the cylinder 21 through a filter to extract high-frequency components within a predetermined period $\Delta T$, which is a period of time from when the piston 22 reaches the top dead center. Then, the controller 3 samples a plurality of high-frequency components from among the extracted high-frequency components, and calculates an average value PA of the sampled high-frequency components. If the average value PA is greater than or equal to a first threshold T1 (T1≤PA), the combustion state is determined to be unallowable knocking. If the average value PA is less than the first threshold T1, but greater than or equal to a second threshold T2 (T2≤PA<T1), the combustion state is determined to be allowable knocking. The controller 3 also calculates a difference $\Delta P$ between the pressure P in the cylinder 21 before reaching the top dead center and the pressure P in the cylinder 21 after reaching the top dead center. If the difference $\Delta P$ is less than a third threshold T3 ($\Delta P<T3$), the combustion state is determined to be misfire. If the difference $\Delta P$ is greater than or equal to the third threshold T3, and the average value PA is less than the second threshold T2 (T3≤$\Delta P$, PA<T2), the combustion state is determined to be normal.

Figure 4:
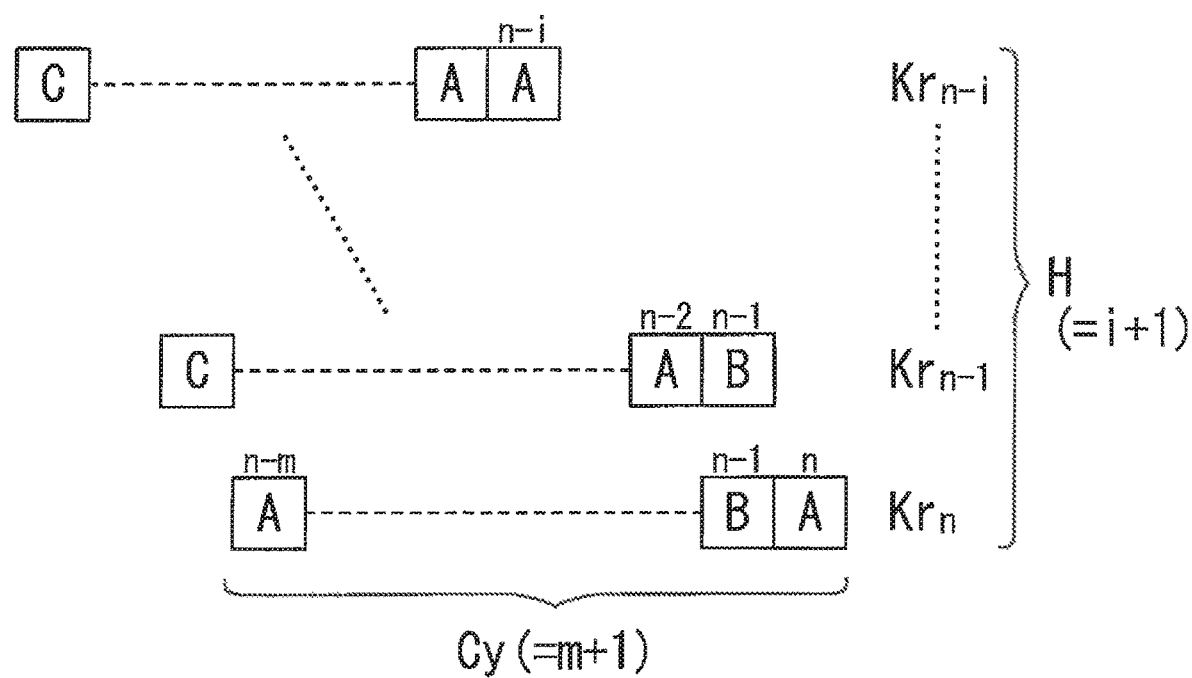
FIG. 4 is a diagram for describing a knocking occurrence ratio and its moving average value

As shown in FIG. 4, assuming that the current cycle is the nth cycle, the controller 3 stores therein the combustion state of each of the past Cy cycles including the current cycle. The controller 3 obtains the number of cycles Ck, in which allowable knocking (C) has occurred, among the past Cy cycles including the current cycle, and divides Ck by Cy, thereby calculating the knocking occurrence ratio $Kr_n$ in the current cycle (step S2). It should be noted that, as shown in FIG. 4, the calculated knocking occurrence ratios Kr over predetermined H cycles including the current cycle are stored in the controller 3.

In a case where the gas engine 1 is used in, for example, power generating equipment, i.e., in a case where the load on the gas engine 1 does not vary frequently, it is desirable that H be relatively great (e.g., 1500 to 2000 cycles). On the other hand, in a case where the gas engine 1 is used as, for example, a main engine of a ship, i.e., in a case where the load on the gas engine 1 varies frequently, it is desirable that H be relatively small (e.g., 100 to 500 cycles).

Next, the controller 3 calculates a moving average value Kr (AVE) of the knocking occurrence ratio Kr (step S3). To be more specific, as shown in FIG. 4, assuming that the current cycle is the nth cycle, the controller averages the knocking occurrence ratios Kr over the past H cycles including the current cycle (Kr (AVE)=($Kr_n + Kr_{n-1}$ + . . . +$Kr_{n-H+1}$)/H).

Next, the controller 3 calculates an occurrence ratio difference $\Delta K$ (=Kt−Kr (AVE)) by subtracting the moving average Kr (AVE) of the knocking occurrence ratio Kr from the target occurrence ratio Kt (step S4). If the occurrence ratio difference $\Delta K$ is positive, the ignition timing should be advanced, and if the occurrence ratio difference $\Delta K$ is negative, the ignition timing should be retarded. Thereafter, based on the occurrence ratio difference $\Delta K$, the controller 3 determines a primary target ignition timing ITf, such that the ignition timing is advanced if the occurrence ratio difference $\Delta K$ is positive, and such that the ignition timing is retarded if the occurrence ratio difference $\Delta K$ is negative. That is, if the occurrence ratio difference $\Delta K$ is positive, the controller 3 determines the primary target ignition timing ITf to be greater than a previous ignition timing $IT_{n-1}$, and if the occurrence ratio difference $\Delta K$ is positive, the controller 3 determines the primary target ignition timing ITf to be less than the previous ignition timing $IT_{n-1}$. More details of the method of determining the primary target ignition timing ITf are as disclosed in, for example, Patent Literature 1.

Next, the controller 3 determines whether or not the speed of changing the ignition timing from the previous ignition timing $IT_{n-1}$ to the primary target ignition timing ITf is within an allowable range. If the aforementioned occurrence ratio difference $\Delta K$ is positive, an ignition timing difference $\Delta IT$ (=ITf−$IT_{n-1}$) obtained by subtracting the previous ignition timing from the primary target ignition timing ITf is also positive, whereas if the occurrence ratio difference $\Delta K$ is negative, the ignition timing difference $\Delta IT$ is also negative.

Specifically, the controller 3 stores therein a preset first advance rate $\alpha$ (unit: deg/sec) and a preset retard rate $\beta$ (unit: deg/sec). For example, the first advance rate is 0.01 to 0.05 [deg/sec], and the retard rate is −0.2 to 0.05 [deg/sec]. Then, the controller 3 compares the ignition timing difference $\Delta IT$ with a converted value ($\alpha$/K) of the first advance rate $\alpha$ (step S6), and compares the ignition timing difference $\Delta IT$ with a converted value ($\beta$/K) of the retard rate $\beta$ (step S7). Here, K is a coefficient for converting the unit of the advance rate or the retard rate from deg/sec into deg/cycle. In the present embodiment, since the gas engine 1 is a 4-cycle engine, K=N/120 [cycle/sec]. It should be noted that it does not matter if step S6 proceeds or follows step S7.

If the ignition timing difference $\Delta IT$ is less than $\alpha$/K and greater than $\beta$/K (YES in step S6 and YES in step S7), i.e., if the ignition timing difference $\Delta IT$ does not exceed the converted value of the first advance rate $\alpha$ and the converted value of the retard rate $\beta$, the controller 3 sets the primary target ignition timing ITf as a secondary target ignition timing ITs (step S8). If the ignition timing difference $\Delta IT$ is less than $\beta$/K, i.e., if the ignition timing difference $\Delta IT$ exceeds the converted value of the retard rate $\beta$, the controller 3 determines the secondary target ignition timing ITs based on the retard rate $\beta$. Specifically, the controller 3 adds the converted value of the retard rate $\beta$ to the previous ignition timing $IT_{n-1}$, and sets the resulting value as the secondary target ignition timing ITs (ITs=$IT_{n-1}$+$\beta$/K).

On the other hand, if the ignition timing difference $\Delta IT$ is greater than $\alpha$/K, i.e., if the ignition timing difference $\Delta IT$ exceeds the converted value of the first advance rate $\alpha$, the controller 3 determines whether or not a rapid advance condition is satisfied (step S10). In the present embodiment, the rapid advance condition contains all of the conditions (a) to (c) described below. However, it will suffice if the rapid advance condition is at least one of the conditions (a) to (c). If the rapid advance condition is at least one of the conditions (a) to (c), frequent allowable knocking and the occurrence of unallowable knocking can be prevented even if the ignition timing is advanced rapidly.

Condition (a): the number of times allowable knocking has occurred within a predetermined period (e.g., 60 seconds) previous to the current time is less than a predetermined number of times (e.g., zero or several times).

Condition (b): the absolute value |ΔN| of the difference between a target rotational speed Nt and the actual rotational speed N is less than a predetermined rotational speed (e.g., 2 to 10 [rpm]).

Condition (c): the absolute value |dD| of the time rate of change of the fuel gas injection period is less than a predetermined rate of change (e.g., 0.1 to 1 [deg/sec]).

The condition (a) is a condition for determining that the combustion state is stable within a proper range, and the conditions (b) and (c) are conditions for determining that the load has become substantially constant. It should be noted that, instead of the conditions (b) and (c), for example, at least one of the conditions (M1) to (M4) described below can be adopted as the condition(s) for determining that the load has become substantially constant.

Condition (M1): the absolute value of the time rate of change of a necessary fuel gas injection amount is less than a threshold.

Condition (M2): the absolute value of the time rate of change of a torque detected by a torque meter provided on the output shaft of the gas engine 1 is less than a threshold.

Condition (M3): in a case where a turbocharger including a compressor and a turbine is connected to the gas engine 1 the absolute value of the difference between an actual charge air pressure and a target charge air pressure is less than a threshold.

If the rapid advance condition is not satisfied (NO in step S10), the controller 3 determines the secondary target ignition timing as based on the first advance rate α (step S11). Specifically, the controller 3 adds the converted value of the first advance rate α to the previous ignition timing $IT_{n-1}$, and sets the resulting value as the secondary target ignition timing ITs (ITs=$IT_{n-1}$+α/K). On the other hand, if the rapid advance condition is satisfied (YES in step S10), the controller 3 determines the secondary target ignition timing ITs so as to achieve a second advance rate γ, which is greater than the first advance rate α (step S12). The second advance rate γ is preset and stored in the controller 3. The second advance rate γ is, for example, 0.1 to 0.5 [deg/sec]. Specifically, the controller 3 adds a converted value of the second advance rate γ to the previous ignition timing $IT_{n-1}$, and sets the resulting value as the secondary target ignition timing ITs (ITs=$IT_{n-1}$+γ/K).

When the secondary target ignition timing ITs is determined in any of steps S8, S9, S11, and S12, the controller 3 sets the secondary target ignition timing ITs as a current ignition timing $IT_n$ (step S14), and controls the spark plug 55 such that the spark plug 55 ignites the air-fuel mixture at the current ignition timing $IT_n$ (step S14). Thereafter, the controller 3 returns to step S1.

Figure 5:
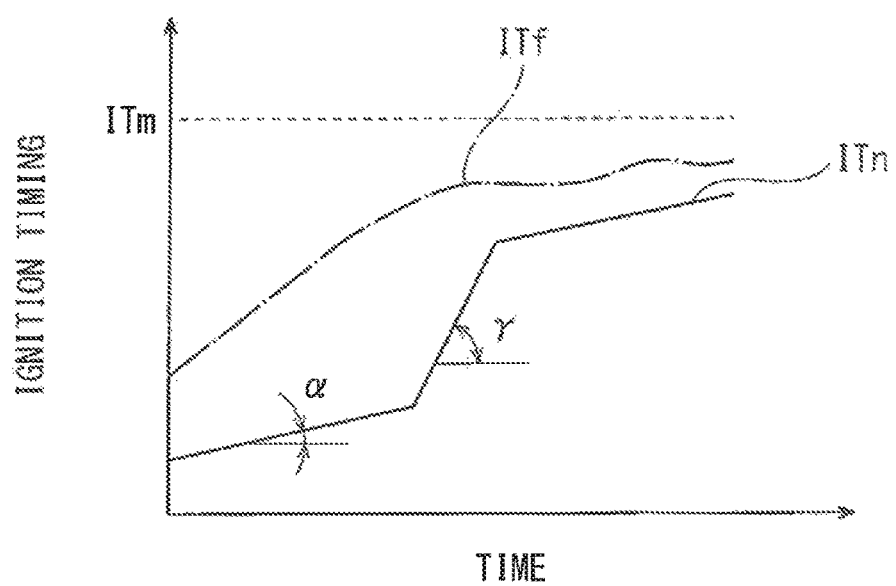
FIG. 5 is a graph showing temporal changes in a primary target ignition timing and a current ignition timing in Embodiment 1.

As described above, in the gas engine system 10 of the present embodiment, if the rapid advance condition is satisfied, the ignition timing is advanced by the second advance rate γ, which is greater than the first advance rate α. Accordingly, the ignition timing is advanced rapidly, and the time required for the optimization of the ignition timing can be reduced. For example, as shown in FIG. 5, in a case where the primary target ignition timing ITf is allowed to be great close to a maximum ignition timing ITm, the current ignition timing $IT_n$ can be brought close to the primary target ignition timing ITf at an early stage.

Embodiment 2

Figure 6:
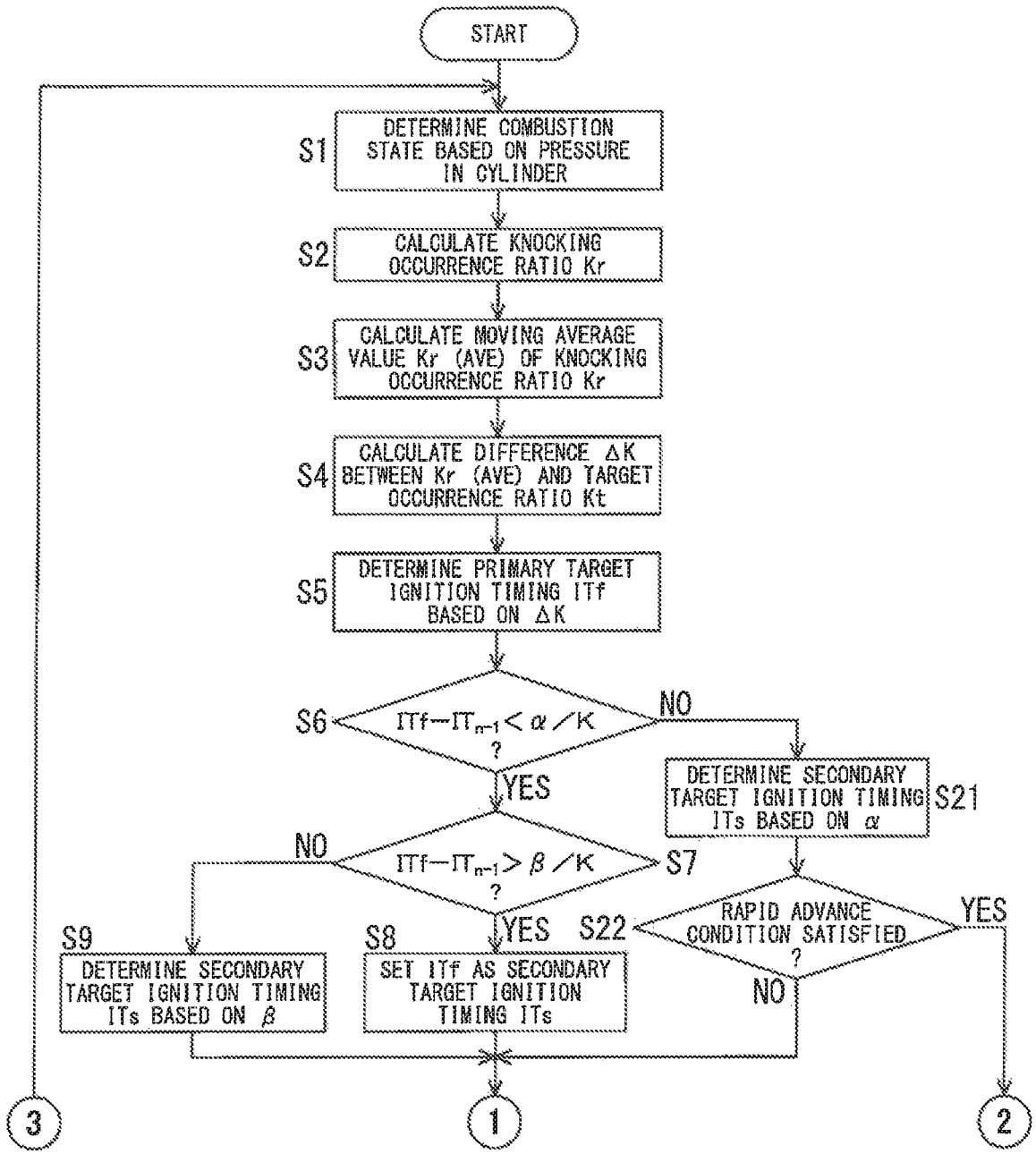
FIG. 6 is a flowchart of control performed by the controller in Embodiment 2 of the present invention.
Figure 7:
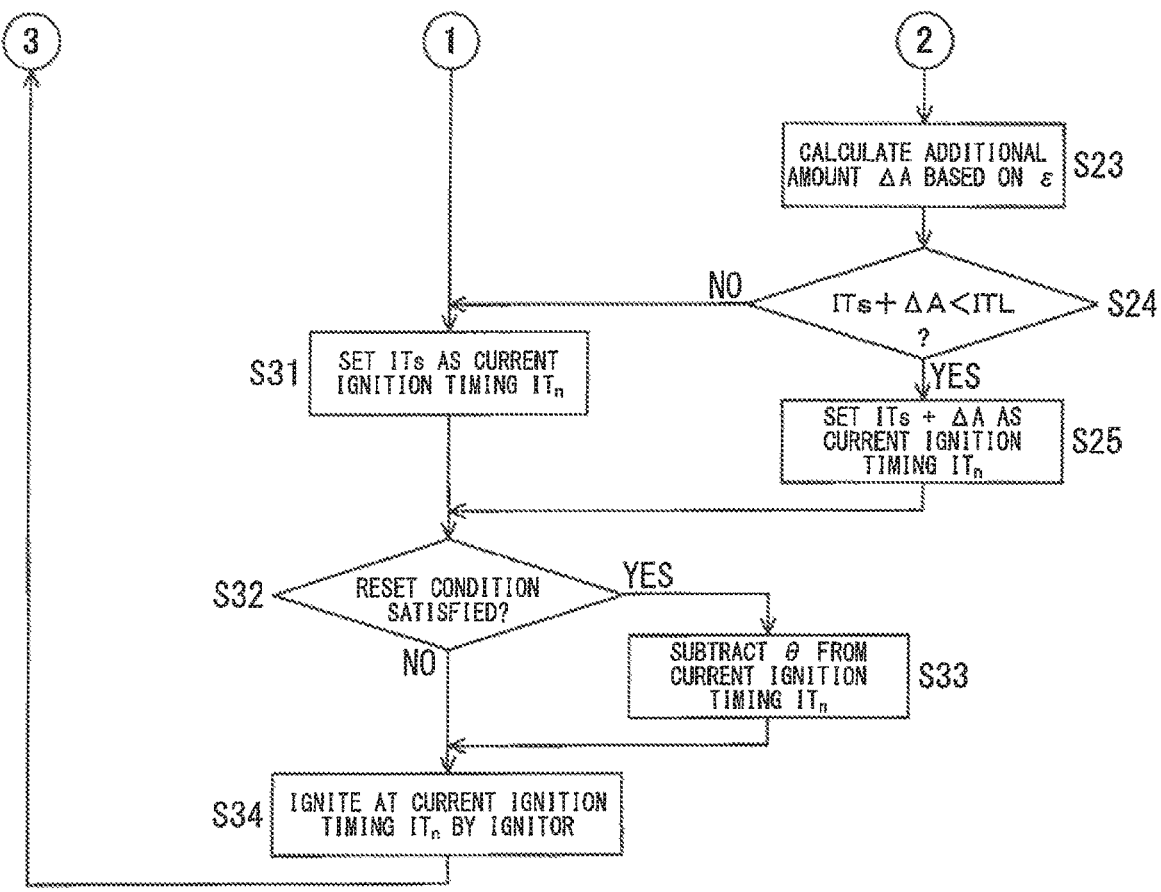
FIG. 7 is a flowchart of control performed by the controller in Embodiment 2.

Next, with reference to FIG. 6 and FIG. 7, a gas engine system according to Embodiment 2 of the present invention is described. It should be noted that the only difference between Embodiment 1 and Embodiment 2 lies in the control performed by the controller 3, and the configuration of the gas engine system according to Embodiment 2 is as shown in FIG. 1.

Figure 2:
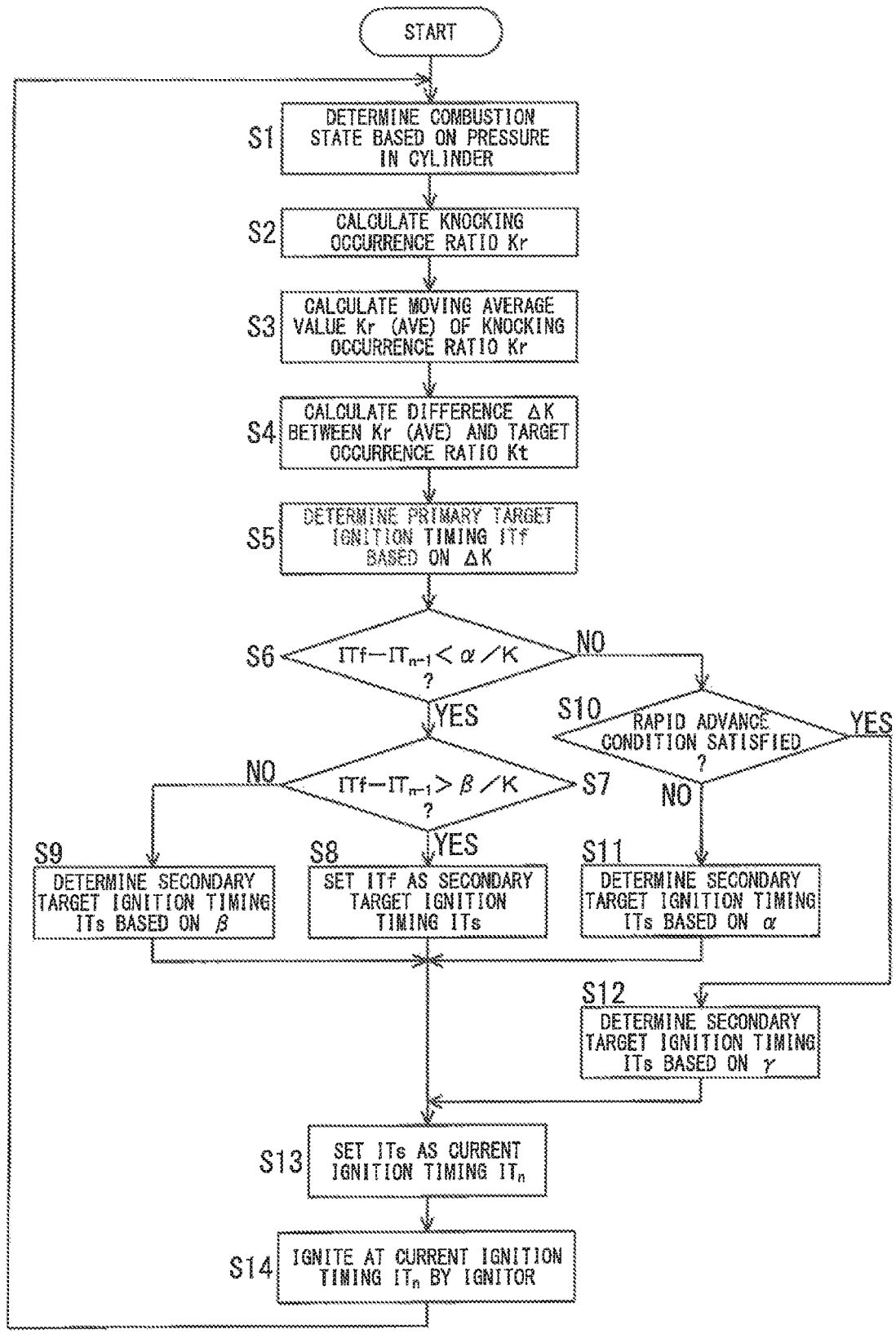
FIG. 2 is a flowchart of control performed by a controller in Embodiment 1.

The flowchart of the present embodiment is the same as the flowchart of FIG. 2 from step S1 to step S9. In the present embodiment, in the case of NO in step S6, the flow thereafter is different from the flow in the flowchart of FIG. 2.

Also in the present embodiment, if the rapid advance condition is satisfied when the ignition timing difference ΔIT (=ITf−$IT_{n-1}$) exceeds the converted value (α/K) of the first advance rate α, the controller 3 determines the current ignition timing $IT_n$ so as to achieve the second advance rate γ, which is greater than the first advance rate α. Specifically, if the ignition timing difference ΔIT is greater than α/K (No in step S6), the controller 3 first determines the secondary target ignition timing ITs based on the first advance rate α (step S21), and then determines whether or not the rapid advance condition is satisfied (step S22).

If the rapid advance condition is not satisfied (NO in step S22), the flow proceeds to step S31, in which the controller 3 sets the secondary target ignition timing ITs as the current ignition timing $IT_n$. The flow proceeds to step S31 also from step S8 and step S9. On the other hand, if the rapid advance condition is satisfied (YES in step S22), the controller 3 calculates an additional amount ΔA (unit: deg/cycle) based on a preset addition rate α (unit: deg/sec) (step S23). Specifically, the controller 3 calculates the additional amount ΔA by dividing the addition rate ε by a coefficient K (ΔA=ε/K).

Thereafter, the controller 3 compares ITs+ΔA with a rapid advance limit value ITL (step S24). The rapid advance limit value ITL may be a fixed value, or may be a variable corresponding to the load when the rapid advance condition is satisfied. If ITs+ΔA is greater than the rapid advance limit value ITL (NO in step S24), the controller 3 proceeds to step S31, in which the controller 3 sets the secondary target ignition timing ITs as the current ignition timing $IT_n$. In other words, even if the rapid advance condition is satisfied, rapid advance of the ignition timing is not performed.

On the other hand, if ITs+ΔA is less than the rapid advance limit value ITL (YES in step S24), the controller 3 determines the current ignition timing $IT_n$ by adding the additional amount ΔA to the secondary target ignition timing ITs (step S25). In other words, the controller 3 sets ITs+ΔA as the current ignition timing $IT_n$. That is, in the present embodiment, the second advance rate γ is the sum of the first advance rate α and the addition rate ε.

When the current ignition timing $IT_n$ is determined in step S31 or step S25, the controller 3 determines whether or not a reset condition is satisfied (step S32). For example, the reset condition is a condition for determining that the load has increased rapidly, and at least one of the conditions (d) and (e) described below can be adopted as the reset condition.

Condition (d): the absolute value |ΔN| of the difference between the target rotational speed Nt and the actual rotational speed N is greater than a predetermined rotational speed (the predetermined rotational speed of the condition (d) may be the same as or different from the predetermined rotational speed of the condition (b)).

Condition (e): the absolute value |dD| of the time rate of change of the fuel gas injection period is greater than a predetermined rate of change (the predetermined rate of change of the condition (e) may be the same as or different from the predetermined rate of change of the condition (c)).

Figure 8:
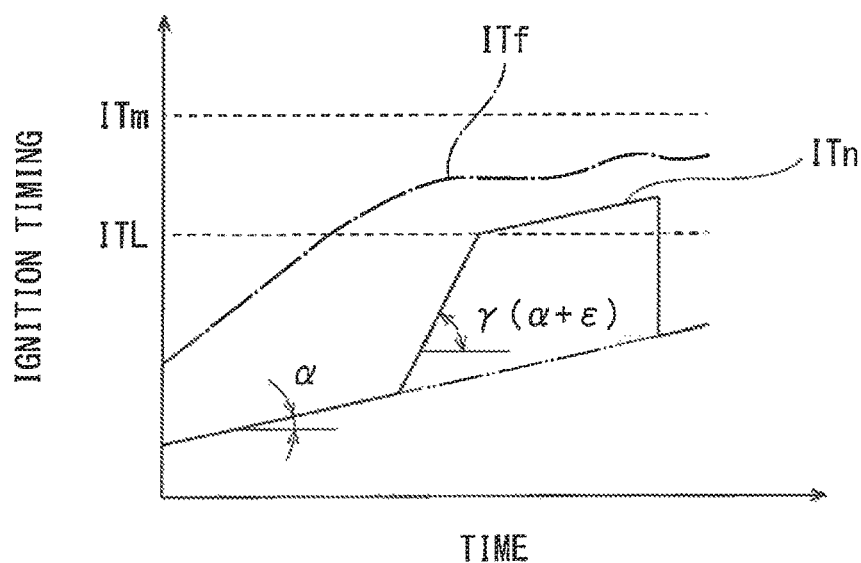
FIG. 8 is a graph showing temporal changes in the primary target ignition timing and the current ignition timing in Embodiment 2.

If the reset condition is not satisfied (NO in step S32), the controller 3 does not correct the current ignition timing $IT_n$. On the other hand, if the reset condition is satisfied (YES in step S32), the controller 3 corrects the current ignition timing $IT_n$ by subtracting a predetermined amount θ from the current ignition timing $IT_n$. The predetermined amount θ may be a fixed value, or may be a variable corresponding to the situation. For example, the predetermined amount θ may be greater than or equal to a cumulative value A of the additional amount ΔA. In this case, as shown in FIG. 8, when the reset condition is satisfied after the ignition timing is advanced rapidly, the current ignition timing $IT_n$ can be shifted to be on a line that is based on the first advance rate α, or shifted to fall below the line. Alternatively, the predetermined amount θ may be less than the cumulative value A.

Thereafter, the controller 3 controls the spark plug 55 such that the spark plug 55 ignites the air-fuel mixture at the current ignition timing $IT_n$ (step S34), and returns to step S1.

The present embodiment can provide the same advantageous effects as those provided by Embodiment 1. Further, in the present embodiment, since the additional amount ΔA is added to the secondary target ignition timing ITs in step S25, the proportion of the advance amount derived from the first advance rate α in the advance amount derived from the second advance rate γ can be stored as a history.

Further, in the present embodiment, in a case where the reset condition is satisfied after the ignition timing is advanced rapidly, the ignition timing can be retarded instantaneously. For example, assume a case where the reset condition is the presence of rapid increase in the load. In this case, even if the load increases rapidly after the ignition timing is advanced rapidly, the occurrence of unallowable knocking can be prevented. In addition, if the predetermined amount θ subtracted from the current ignition timing $IT_n$ is greater than or equal to the cumulative value A of the additional amount A, the advantage that the occurrence of unallowable knocking is prevented can be obtained notably.

Other Embodiments

The present invention is not limited to the above-described embodiment. Various modifications can be made without departing from the spirit of the present invention.

For example, step S32 and step S34 of Embodiment 2 may be performed between step S13 and step S14 of Embodiment 1.

In Embodiment 1, a step of comparing the secondary target ignition timing ITs with the ignition timing limit value ITL may be performed after step S12, and the flow may proceed to step S11 if ITs>ITL.

REFERENCE SIGNS LIST 10 gas engine system
1 gas engine
21 cylinder
3 controller
55 spark plug (ignitor)
61 pressure sensor

The invention claimed is:

1. A gas engine system comprising:
a gas engine including at least one cylinder where combustion of an air-fuel mixture of a fuel gas and air is performed;
an ignitor provided in the at least one cylinder;
a pressure sensor configured to detect a pressure in the at least one cylinder; and
a controller controlling the ignitor, the controller being configured to:
calculate a delay calculation value of a knocking occurrence ratio based on the detected pressure in the cylinder, which is detected by the pressure sensor;
determine a primary target ignition timing based on an occurrence ratio difference calculated by subtracting the delay calculation value of the knocking occurrence ratio from a target occurrence ratio;
advance an ignition timing in response to the occurrence ratio difference being calculated as positive, and retard the ignition timing in response to the occurrence ratio difference being calculated as negative;
set the primary target ignition timing as a current ignition timing in response to (i) the occurrence ratio difference being calculated as positive and (ii) an ignition timing difference, which is calculated by subtracting a previous ignition timing from the primary target ignition timing, not exceeding a converted value of a first advance rate;
when the occurrence ratio difference is positive and the ignition timing difference exceeds the converted value of the first advance rate, determine whether a rapid advance condition is satisfied;
set a secondary target ignition timing as the current ignition timing when the rapid advance condition is not satisfied, the secondary target ignition timing being calculated by adding the converted value of the first advance rate to the previous ignition timing;
determine the current ignition timing by advancing the ignition timing by a second advance rate greater than the first advance rate when the rapid advance condition is satisfied; and
control the ignitor to ignite the air-fuel mixture in the at least one cylinder at the current ignition timing.

2. The gas engine system according to claim 1, wherein:
the rapid advance condition is at least one of the following conditions (a) to (c):
the condition (a) is a number of times of allowable knocking within a predetermined period previous to a current time is less than a predetermined number of times;
the condition (b) is an absolute value of a difference between a target rotational speed and an actual rotational speed is less than a predetermined rotational speed; and
the condition (c) is an absolute value of a time rate of change of a fuel gas injection period is less than a predetermined rate of change.

3. The gas engine system according to claim 1, wherein if when the rapid advance condition is satisfied, the controller is configured to determine the current ignition timing by adding (i) an additional amount calculated based on a preset addition rate to (ii) the secondary target ignition timing obtained by adding the converted value of the first advance rate to the previous ignition timing.

4. The gas engine system according to claim 1, wherein:
the controller is configured to determine whether a reset condition is satisfied, and
when the reset condition is satisfied, the controller is configured to correct the current ignition timing by subtracting a predetermined amount from the current ignition timing.

5. The gas engine system according to claim 4, wherein the reset condition is at least one of the following conditions (d) and (e):
   the condition (d) is an absolute value of a difference between a target rotational speed and an actual rotational speed is greater than a predetermined rotational speed; and
   the condition (e) is an absolute value of a time rate of change of a fuel gas injection period is greater than a predetermined rate of change.

6. The gas engine system according to claim 2, wherein when the rapid advance condition is satisfied, the controller is configured to determine the current ignition timing by adding (i) an additional amount calculated based on a preset addition rate to (ii) the secondary target ignition timing obtained by adding the converted value of the first advance rate to the previous ignition timing.

7. The gas engine system according to claim 2, wherein:
   the controller is configured to determine whether a reset condition is satisfied, and
   when the reset condition is satisfied, the controller is configured to correct the current ignition timing by subtracting a predetermined amount from the current ignition timing.

8. The gas engine system according to claim 3, wherein:
   the controller is configured to determine whether a reset condition is satisfied, and
   when the reset condition is satisfied, the controller is configured to correct the current ignition timing by subtracting a predetermined amount from the current ignition timing.

9. The gas engine system according to claim 6, wherein:
   the controller is configured to determine whether a reset condition is satisfied, and
   when the reset condition is satisfied, the controller is configured to correct the current ignition timing by subtracting a predetermined amount from the current ignition timing.

10. The gas engine system according to claim 7, wherein the reset condition is at least one of the following conditions (d) and (e):
    the condition (d) is an absolute value of a difference between a target rotational speed and an actual rotational speed is greater than a predetermined rotational speed; and
    the condition (e) is an absolute value of a time rate of change of a fuel gas injection period is greater than a predetermined rate of change.

11. The gas engine system according to claim 8, wherein the reset condition is at least one of the following conditions (d) and (e):
    the condition (d) is an absolute value of a difference between a target rotational speed and an actual rotational speed is greater than a predetermined rotational speed; and
    the condition (e) is an absolute value of a time rate of change of a fuel gas injection period is greater than a predetermined rate of change.

12. The gas engine system according to claim 9, wherein the reset condition is at least one of the following conditions (d) and (e):
    the condition (d) is an absolute value of a difference between a target rotational speed and an actual rotational speed is greater than a predetermined rotational speed; and
    the condition (e) is an absolute value of a time rate of change of a fuel gas injection period is greater than a predetermined rate of change.

* * * * *